(12) United States Patent
Benjamini (10) Patent No.: US 9,395,744 B2
(45) Date of Patent: Jul. 19, 2016

(54) DE-SKEWING TRANSMITTED DATA (71) Applicant: International Business Machines Corporation, Armonk, NY (US)

(72) Inventor: Yiftach Benjamini, Givat Ela (IL)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 14/162,890

(22) Filed: Jan. 24, 2014

(65) Prior Publication Data

US 2015/0212157 A1 Jul. 30, 2015

(51) Int. Cl.
*G06F 1/00* (2006.01)
*G06F 13/00* (2006.01)
*H04J 3/06* (2006.01)
*H04L 25/02* (2006.01)
*H04L 25/14* (2006.01)
*H04L 25/49* (2006.01)

(52) U.S. Cl.
CPC ...... *G06F 1/00* (2013.01); *G06F 13/00* (2013.01); *H04L 25/14* (2013.01); *H04L 25/49* (2013.01); *H04J 3/0685* (2013.01); *H04L 25/0272* (2013.01)

(58) Field of Classification Search
CPC ..... H04L 25/14; H04L 25/49; H04L 25/0272; H04L 25/08; H04L 12/18; H04J 3/0685
USPC .......................................................... 714/700
See application file for complete search history.

(56) References Cited

U.S. PATENT DOCUMENTS

| | | | |
|---|---|---|---|
| 7,454,537 B1 | 11/2008 | Xue | |
| 7,546,494 B2 * | 6/2009 | Haas et al. | 714/700 |
| 7,551,646 B1 * | 6/2009 | Zhang et al. | 370/503 |
| 7,760,749 B2 | 7/2010 | Wang et al. | |
| 8,259,755 B2 | 9/2012 | Pontius | |
| 8,385,374 B1 * | 2/2013 | Wohlgemuth | 370/509 |
| 8,761,209 B1 * | 6/2014 | Brown et al. | 370/540 |
| 8,913,705 B2 * | 12/2014 | Chang | H04L 25/00 370/509 |
| 8,984,380 B2 * | 3/2015 | Vijayaraghavan et al. | 714/776 |
| 9,059,850 B2 * | 6/2015 | Wang | |
| 2010/0092174 A1 * | 4/2010 | Brown et al. | 398/79 |
| 2010/0158518 A1 * | 6/2010 | Shin et al. | 398/45 |
| 2010/0215060 A1 * | 8/2010 | Haas | 370/509 |
| 2010/0246389 A1 * | 9/2010 | Toyoda et al. | 370/226 |

(Continued)

OTHER PUBLICATIONS

Voss et al., "Design of a Digital Send-Site Synchronizing and Deskewing Circuit for Multi-Lane Serial High-Speed Communication," Proceedings of the 27th International Conference on Microelectronics (MIEL 2010), IEEE, May 2010, pp. 287-290.

(Continued)

*Primary Examiner* — James C Kerveros (57) ABSTRACT

Techniques for de-skewing transmitted data are described herein. In one example, a method can include detecting, via a processor, a number of data lanes that transmit data. The method can also include designating, via the processor, a number of buffers to store the data transmitted through each data lane, wherein the number of buffers is less than the number of data lanes. Additionally, the method can include detecting, via the processor, an alignment marker for each data lane. Furthermore, the method can include storing, via the processor, the transmitted data received from the data lanes in the buffers, and de-skewing, via the processor, the transmitted data when the alignment marker for each data lane has been detected.

20 Claims, 4 Drawing Sheets

(56) References Cited

U.S. PATENT DOCUMENTS

| | | | |
|---|---|---|---|
| 2013/0083810 A1* | 4/2013 | Ghiasi et al. | 370/535 |
| 2013/0262941 A1* | 10/2013 | Wang | 714/712 |
| 2014/0016637 A1* | 1/2014 | Masood et al. | 370/390 |
| 2014/0056370 A1* | 2/2014 | Chang | H04L 25/14 375/259 |
| 2014/0189459 A1* | 7/2014 | Vijayaraghavan et al. | 714/755 |
| 2014/0286346 A1* | 9/2014 | Ghiasi | 370/401 |
| 2014/0376566 A1* | 12/2014 | Mehta et al. | 370/419 |
| 2015/0106668 A1* | 4/2015 | Ran | 714/704 |

OTHER PUBLICATIONS

Chen et al., "Optimized Parallel Transmission in OTN/WDM Networks to Support High-Speed Ethernet With Multiple Lane Distribution," Journal of Optical Communications and Networking, vol. 4, No. 3, Mar. 2012.

* cited by examiner

DE-SKEWING TRANSMITTED DATA

BACKGROUND

The present invention relates to de-skewing transmitted data, and more specifically, but not exclusively, to de-skewing transmitted data with a number of buffers.

SUMMARY

According to an embodiment described herein, a method for transmitting data can include detecting, via a processor, a number of data lanes that transmit data. The method can also include designating, via the processor, a number of buffers to store the data transmitted through each data lane, wherein the number of buffers is less than the number of data lanes. Additionally, the method can include detecting, via the processor, an alignment marker for each data lane. Furthermore, the method can include storing, via the processor, the transmitted data received from the data lanes in the buffers, and de-skewing, via the processor, the transmitted data when the alignment marker for each data lane has been detected.

In another embodiment, a computing device can transmit data. The computing device may include buffers to store transmitted data and logic that can detect a number of data lanes that transmit data and designate a number of the buffers to store the data transmitted through each data lane, wherein the number of the buffers is less than the number of data lanes. The logic can also detect an alignment marker for each data lane and store the transmitted data received from the data lanes in the buffers. Furthermore, the logic can de-skew the transmitted data when the alignment marker for each data lane has been detected.

According to another embodiment described herein, a computer program product for transmitting data can include a computer-readable storage medium having program code embodied therewith. The program code can be executable by a processing circuit to perform a method comprising detecting, via the processing circuit, a number of data lanes that transmit data and designating, via the processing circuit, a number of the buffers to store the data transmitted through each data lane, wherein the number of the buffers is less than the number of data lanes. The method can also include detecting, via the processing circuit, an alignment marker for each data lane and storing, via the processing circuit, the transmitted data received from the data lanes in the buffers. Furthermore, the method can include de-skewing, via the processing circuit, the transmitted data when the alignment marker for each data lane has been detected.

DETAILED DESCRIPTION

According to embodiments of the present disclosure, a computing device can de-skew transmitted data. De-skewing data, as referred to herein, can include detecting data from any suitable number of data lanes and/or buffers, and rearranging the data to form a data stream. In some embodiments, a computing device can de-skew data to rearrange a transmitted data stream that has been received in a different sequential order than the data stream was originally transmitted. For example, a computing device can receive a data stream that is transmitted through any suitable number of data lanes. In some embodiments, a computing device may operate as a host that receives transmitted data, such as a data stream, from a client computing device. In some examples, the client computing device can transmit a data stream by splitting the data stream into blocks and transmitting the blocks through a number of data lanes. For example, the client computing device may send a first block through a first data lane, a second block though a second data lane, and continue sending blocks using a round robin technique. In some embodiments, the host computing device may receive the blocks in a different order than the original order the blocks were transmitted due to unpredictable latency in the data transmission. Therefore, the host computing device may store any suitable number of data blocks in buffers and de-skew the transmitted data when a data stream has been received.

Figure 1:
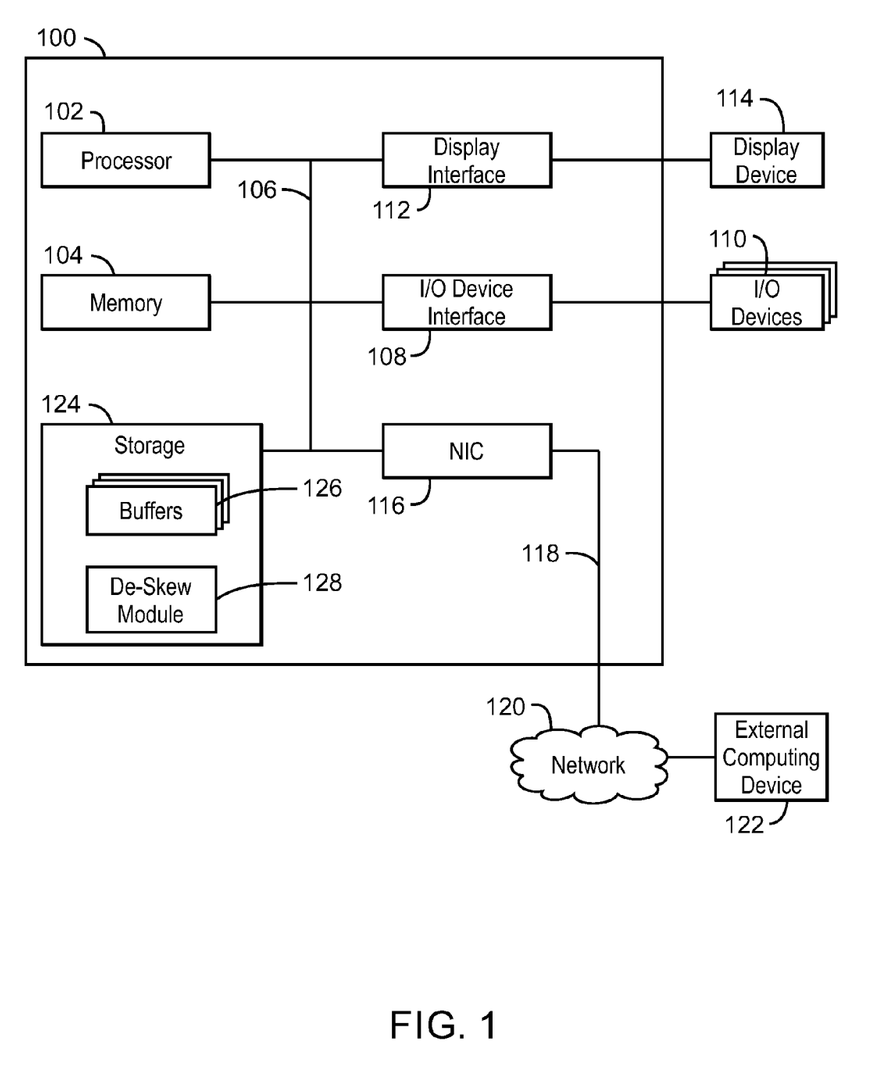
FIG. 1 is an example of a computing device that can de-skew transmitted data.

FIG. 1 is an example of a computing device that can de-skew transmitted data. The computing device 100 may be for example, a desktop computer, laptop computer, tablet computer, or smartphone. The computing device 100 may include a processor 102 that is adapted to execute stored instructions, a memory device 104 that can store said instructions. The processor can be a single-core processor, multi-core processor, computing cluster, or any number of other configurations. The memory 104 can include random access memory (RAM), read only memory, flash memory, or any other suitable memory systems. The instructions executed by the processor 102 may be used to implement a method that can de-skew transmitted data.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (also referred to herein as a NIC) 116 may be adapted to connect the computing device 100 through the system interconnect 106 to a network 118. In some embodiments, the NIC 116 can transmit data using any suitable interface or protocol, such as the internet small computer system interface, among others. The NIC 116 may transmit data through any suitable number of data lanes 118 to a network 120. A data lane, as referred to herein, can include any suitable link that can transmit data. In some examples, the system interconnect 106 can also include any suitable number of data lanes that transmit data. The network 120 may be a cellular network, a radio network, a wide area network (WAN), a local area network (LAN), or the Internet, among others. An external computing device 122 may connect to the computing device 100 through the network 120.

The processor 102 may also be linked through the system interconnect 106 to a storage device 124 that can include a hard drive, an optical drive, a USB flash drive, an array of drives, or any combinations thereof. In some examples, the storage device 124 can include any suitable number of buffers 126 and a de-skew module 128 that can de-skew transmitted data. In some embodiments, the buffers 126 can store the data received from the data lanes 118. For example, the buffers 126 may store any suitable amount of data from each data lane 118. In some embodiments, the de-skew module 126 can determine when the data stored in the buffers 126 are to be de-skewed. As discussed above, de-skewing data includes combining data from multiple buffers and data lanes into an originally transmitted data stream. For example, an external computing device 122 may send data to the computing device 100 through a network 120 using any suitable number of data lanes 118. In some embodiments, transmitting the data through the data lanes 118 can introduce a latency or delay in the data transmission. Accordingly, the buffers 126 may store data in a different order than the data was originally sent from the external computing device 122. In some examples, the buffers 126 may receive data from a first data lane after data is received from a second data lane. In some embodiments, the de-skew module 128 can rearrange the data stored in the buffers 126 and data received directly from at least one data lane 118 to form the originally transmitted data stream. In some examples, the de-skew module 128 can send the originally transmitted data stream to any suitable application or hardware component.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, etc.). Furthermore, any of the functionalities of the de-skew module 128 may be partially, or entirely, implemented in hardware and/or in the processor 102. For example, the functionality may be implemented with an application specific integrated circuit, in logic implemented in the processor 102, logic implemented in the NIC 116, I/O device interface 108, or logic implemented in a memory controller, among others.

Figure 2:
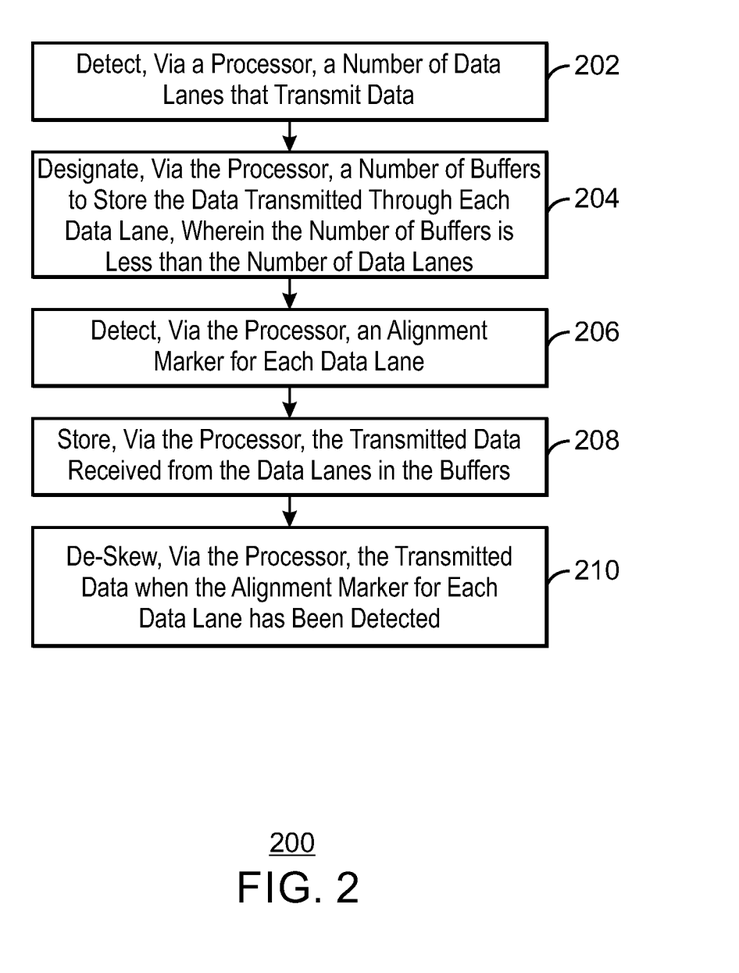
FIG. 2 is a process flow diagram of an example method for de-skewing transmitted data.

FIG. 2 is a process flow diagram of an example method for de-skewing transmitted data. The method 200 can be implemented with any suitable computing device, such as the computing device 100 of FIG. 1.

At block 202, the de-skew module 128 can detect, via a processor, a number of data lanes that transmit data. As discussed above, the de-skew module 128 may detect data that is transmitted from additional hardware components or computing devices through any suitable protocol that uses multiple data lanes. For example, the de-skew module 128 may detect that a data stream has been separated so that blocks are transmitted simultaneously through multiple data lanes using an Ethernet protocol or standard, among others. In some examples, the de-skew module 128 can detect the number of data lanes used to transmit the data from a data stream.

At block 204, the de-skew module 128 can designate, via the processor, a number of buffers to store the data transmitted through each data lane, wherein the number of buffers is less than the number of data lanes. In some embodiments, the de-skew module 128 can designate any suitable number of buffers based on the number of data lanes. In some examples, the de-skew module 128 may designate a number of buffers equal to one less than the number of detected data lanes. The de-skew module 128 may store the data received from some of the data lanes in buffers, while the de-skew module 128 may detect data directly from at least one data lane without a buffer.

At block 206, the de-skew module 128 can detect, via the processor, an alignment marker for each data lane. An alignment marker, as referred to herein, includes any suitable number of bits or bytes that indicate when data is transmitted through a data lane. For example, an alignment marker may be inserted simultaneously into each data lane during transmission. The de-skew module 128 may detect the alignment marker in each data lane, which indicates the skew for the data lane. The skew, as referred to herein, indicates the amount of latency or delay that corresponds with the transmission of data. In some embodiments, the de-skew module 128 can determine that the skew is equal to a skew value based on the number of blocks received between the first received assignment marker and the last received assignment marker. For example, since the alignment markers are transmitted simultaneously from a client, the de-skew module 128 in a host computing device can detect the amount of skew by determining a time or amount of data that separates the first received alignment marker and the last received alignment marker. In some embodiments, the amount of data stored in a buffer may not exceed the skew value.

At block 208, the de-skew module 128 can store, via the processor, the transmitted data received from the data lanes in the buffers. In some embodiments, the de-skew module 128 can store the data for a number of the data lanes in buffers. For example, the de-skew module 128 may detect an alignment marker for a first data lane that indicates the data following the alignment marker is to be stored in a buffer. In some embodiments, the de-skew module 128 can store the data for each data lane except for the data lane corresponding to the last received alignment marker. For example, the de-skew module 128 may determine that transmitted data from the data lane corresponding to the last received alignment marker is to be directly received and de-skewed with additional data stored in any suitable number of buffers.

In some embodiments, the de-skew module 128 can detect at least two alignment markers simultaneously, and store transmitted data for each data lane corresponding to the at least two alignment markers in buffers based on sequential order. For example, the de-skew module 128 may detect alignment markers simultaneously from data lane 1 and data lane 2. The de-skew module 128 may assign data lane 1 to the first buffer and data lane 2 to the second buffer. In some examples, the de-skew module 128 may assign any suitable number of data lanes to buffers based on sequential order.

At block 210, the de-skew module 128 can de-skew, via the processor, the transmitted data when the alignment marker for each data lane has been detected. In some embodiments, the de-skew module 128 can detect that a de-skew operation is to be performed when the alignment marker for each of the data lanes is detected. The de-skew module 128 can de-skew the transmitted data stream by rearranging the data stored in the buffers along with the data received from the data lane not assigned to a buffer. In some examples, the techniques described herein can reduce the number of buffers that are to store data. The de-skewed data represent the data stream sent from a client computing device or hardware component before any latency skewed the transmitted data. In some examples, the de-skewed data can be sent to any suitable application or hardware component, among others.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
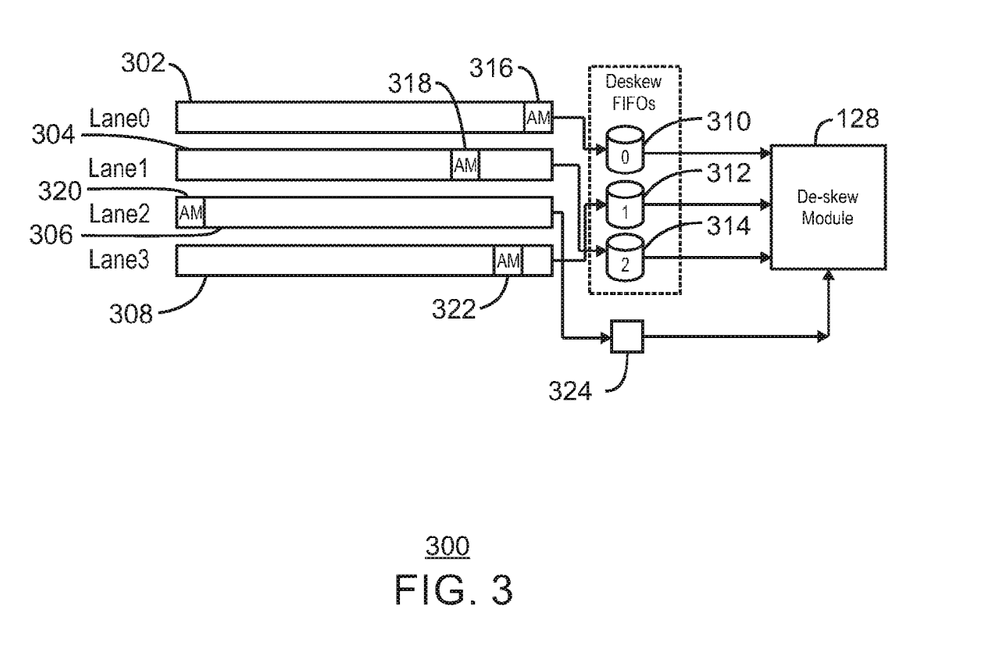
FIG. 3 is an example block diagram of a system for de-skewing transmitted data.

FIG. 3 is an example block diagram of a system for de-skewing transmitted data. The functionality of the system 300 can be implemented with any suitable computing device, such as the computing device 100 of FIG. 1. In some embodiments, the system 300 can include any suitable number of data lanes such as Lane0 302, Lane1 304, Lane2 306, and Lane3 308. The system 300 can also include any suitable number of buffers, wherein the number of buffers do not exceed one less than the number of data lanes. In the example system 300, four data lanes are depicted that transmit data to three buffers (e.g. buffer 0 310, buffer 1, 312, and buffer 2 314). In some embodiments, each buffer 310, 312, and 314 can store the data for any of the data lanes 302, 304, 306, and 308.

In some embodiments, the buffers 310, 312, and 314 store the data for the data lanes that are the first to transmit alignment markers 316, 318, 320, and 322. As discussed above, the alignment markers 316, 318, 320, and 322 can indicate the skew associated with the transmission of data. For example, the alignment markers 316, 318, 320, and 322 may be simultaneously inserted into a data stream. When the system 300 detects the alignment markers 316, 318, 320, and 322, the buffers 310, 312, and 314 store the data that follows each alignment marker 316, 318, 320, and 322. For example, the buffers 310, 312, and 314 may store a predetermined amount of data that is equal to the amount of data that can be transmitted between the first received alignment marker 316 and the last alignment marker 320 to be received. In some embodiments, the buffers 310, 312, and 314 are assigned to each data lane 302, 304, 306, and 308 based on an order of arrival of the alignment marker. For example, the first buffer 310 may be assigned to the data lane that is the first to transmit an alignment marker. In the example of FIG. 3, data Lane0 302 is the first to transmit an alignment marker 316, so data following the alignment marker 316 is stored in the buffer 310. Also, in the example of FIG. 3, data Lane3 308 is the second to transmit an alignment marker 322 so the data following the alignment marker 322 is stored in the second buffer 312. The data Lane1 304 is the third data lane to transmit the alignment marker 318 so the data following the alignment marker 318 is stored in the third buffer 314. The data 324 transmitted through data lane2 306 can be transmitted directly to the de-skew module 128 since data Lane2 306 transmitted the alignment marker 320 last in the example illustrated in FIG. 3. Thus, the data 324 transmitted through the data Lane2 306 may not be stored in a buffer 310, 312, or 314.

A de-skew module 128 can retrieve the data stored in each of the buffers 310, 312, and 314 as well as the data 324 from data Lane2 306 not assigned to a buffer. In the example illustrated in FIG. 3, the data Lane2 306 transmits the alignment marker 320 last out of the data lanes 302, 304, 306, and 308. Thus, the de-skew module 128 can detect the data 324 directly from the data Lane2 306. In some embodiments, the de-skew module 128 can use any suitable protocol or technique to combine the data stored in the buffers 310, 312, and 314 along with the data 324 from data Lane2 306.

It is to be understood that the example illustrated in FIG. 3 is for illustrative purposes only. In some examples, the system 300 may include any suitable number of data lanes and buffers. Further, the de-skew module 128 may detect data directly from any suitable number of data lanes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
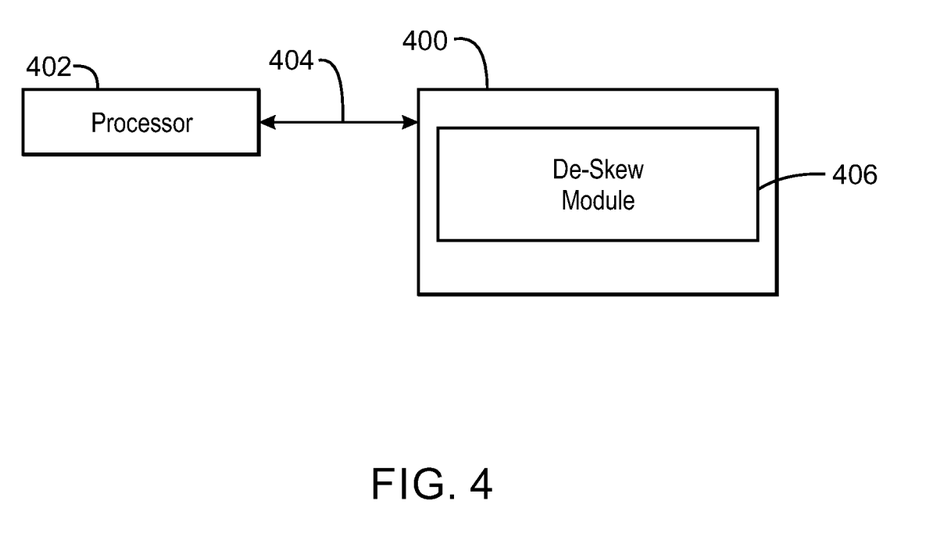
FIG. 4 is an example of a block diagram depicting an example of a tangible, non-transitory computer-readable medium that can de-skew transmitted data.

Referring now to FIG. 4, a block diagram is depicted of an example of a tangible, non-transitory computer-readable medium that can de-skew transmitted data. The tangible, non-transitory, computer-readable medium 400 may be accessed by a processor 402 over a computer interconnect 404. Furthermore, the tangible, non-transitory, computer-readable medium 400 may include code to direct the processor 402 to perform the operations of the current method.

The various software components discussed herein may be stored on the tangible, non-transitory, computer-readable medium 400, as indicated in FIG. 4. For example, a de-skew module 408 may be adapted to direct the processor 402 to detect transmitted data from any suitable number of buffers and data lanes and de-skew the transmitted data. In some embodiments, the de-skew module 408 can detect transmitted data stored in a number of buffers and transmitted data that is received directly from one data lane. It is to be understood that any number of additional software components not shown in FIG. 4 may be included within the tangible, non-transitory, computer-readable medium 400, depending on the specific application.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for transmitting data comprising:
   detecting, via a processor, a number of data lanes that transmit data;
   designating, via the processor, a number of buffers to store the data transmitted through each data lane, wherein the number of buffers is less than the number of data lanes;
   detecting, via the processor, an alignment marker for each data lane;
   storing, via the processor, the transmitted data received from the data lanes in the buffers; and
   de-skewing, via the processor, the transmitted data when the alignment marker for each data lane has been detected.

2. The method of claim 1, wherein the transmitted data stored in each buffer does not exceed a skew value, the skew value comprising a time or an amount of data that separates a first received alignment marker and a last received alignment marker.

3. The method of claim 1, wherein the buffers are assigned to each data lane based on an order of arrival of the alignment marker.

4. The method of claim 1, wherein storing the transmitted data comprises storing the transmitted data received prior to a last alignment marker corresponding to one of the data lanes.

5. The method of claim 1, comprising:
   detecting at least two alignment markers simultaneously; and
   storing transmitted data for each data lane corresponding to the at least two alignment markers in buffers based on sequential order.

6. The method of claim 1, wherein de-skewing comprises detecting transmitted data from at least one data lane.

7. The method of claim 1, wherein the transmitted data is transmitted using an Ethernet standard.

8. A computing device for transmitting data, comprising:
   buffers to store transmitted data; and
   logic to:
      detect a number of data lanes that transmit data;
      designate a number of the buffers to store the data transmitted through each data lane, wherein the number of the buffers is less than the number of data lanes;
      detect an alignment marker for each data lane;
      store the transmitted data received from the data lanes in the buffers; and
      de-skew the transmitted data when the alignment marker for each data lane has been detected.

9. The computing device of claim 8, wherein the transmitted data stored in each buffer does not exceed a skew value, the skew value comprising a time or an amount of data that separates a first received alignment marker and a last received alignment marker.

10. The computing device of claim 8, wherein the buffers are assigned to each data lane based on an order of arrival of the alignment marker.

11. The computing device of claim 8, wherein the logic is to store the transmitted data received prior to a last alignment marker corresponding to one of the data lanes.

12. The computing device of claim 8, wherein the logic is to:
   detect at least two alignment markers simultaneously; and
   store transmitted data for each data lane corresponding to the at least two alignment markers in buffers based on sequential order.

13. The computing device of claim 8, wherein the logic is to detect transmitted data from at least one data lane.

14. The computing device of claim 8, wherein the transmitted data is transmitted using an Ethernet standard.

15. A computer program product for de-skewing transmitted data, the computer program product comprising a computer readable storage medium having program code embodied therewith, the program code executable by a processing circuit to perform a method comprising:
   detecting, via the processing circuit, a number of data lanes that transmit data;
   designating, via the processing circuit, a number of buffers to store a portion of the data transmitted through the data lanes, wherein the number of the buffers is less than the number of data lanes;
   detecting, via the processing circuit, an alignment marker for each data lane;
   storing, via the processing circuit, the portion of the transmitted data received from the data lanes in the buffers; and
   de-skewing, via the processing circuit, the transmitted data when the alignment marker for each data lane has been detected, the de-skewing comprising detecting transmitted data directly from at least one of the data lanes.

16. The computer program product of claim 15, wherein the transmitted data stored in each buffer does not exceed a skew value, the skew value comprising a time or an amount of data that separates a first received alignment marker and a last received alignment marker.

17. The computer program product of claim 15, wherein the buffers are assigned to each data lane based on an order of arrival of the alignment marker.

18. The computer program product of claim 15, wherein program code executable by the processing circuit to perform a method comprising storing the transmitted data received prior to a last alignment marker corresponding to one of the data lanes.

19. The computer program product of claim 15, the program code executable by the processing circuit to perform a method comprising:
   detecting at least two alignment markers simultaneously; and
   storing transmitted data for each data lane corresponding to the at least two alignment markers in buffers based on sequential order.

20. The computer program product of claim 15, wherein the transmitted data is transmitted using an Ethernet standard.

\* \* \* \* \*